United States Patent [19]
Brooks

[11] 3,988,244
[45] Oct. 26, 1976

[54] CARTRIDGE FILTER

[75] Inventor: Gary L. Brooks, Lake Geneva, Wis.

[73] Assignee: Sta-Rite Industries, Inc., Delavan, Wis.

[22] Filed: June 30, 1975

[21] Appl. No.: 591,774

[52] U.S. Cl. .............................. 210/317; 210/438; 210/440; 210/493 R
[51] Int. Cl.² ......................................... B01D 27/06
[58] Field of Search .......... 210/295, 315, 316, 317, 210/338, 438, 440, 443, 444, 493 R, 497 R

[56] References Cited
UNITED STATES PATENTS

| | | | |
|---|---|---|---|
| 2,387,368 | 10/1945 | Vokes | 210/443 X |
| 3,211,292 | 10/1965 | Bull | 210/444 X |
| 3,349,919 | 10/1967 | Royer et al. | 210/338 X |
| 3,361,260 | 1/1968 | Buckman | 210/493 X |
| 3,370,708 | 2/1968 | Hultgren et al. | 210/315 X |
| 3,420,377 | 1/1969 | Vandersip | 210/315 |

FOREIGN PATENTS OR APPLICATIONS

| | | | |
|---|---|---|---|
| 550,998 | 9/1956 | Belgium | 210/444 |

*Primary Examiner*—Charles N. Hart
*Assistant Examiner*—Robert H. Spitzer

[57] ABSTRACT

A cartridge filter in a fluid system includes a housing having an inlet, an outlet and a filter assembly that includes a pair of concentric, telescoped filter elements positioned within the housing. Fluid from the inlet flows from outside and from inside the assembly radially in opposite directions through the filter elements to the region between the elements, which region communicates with the outlet. The pressure differentials resulting from flow through the filter elements results in radially directed forces tending to collapse the elements toward one another. A fluid carrier element positioned between the filter elements communicates with the housing outlet and maintains a distance between the concentric filter elements while allowing radial and longitudinal flow of filtered fluid to the outlet. The carrier element in maintaining a distance between the filter elements, transmits the radially directed forces exerted on the filter elements by the pressurized fluid thereby substantially cancelling the forces and preventing collapse of the filter elements.

5 Claims, 5 Drawing Figures

U.S. Patent    Oct. 26, 1976    3,988,244
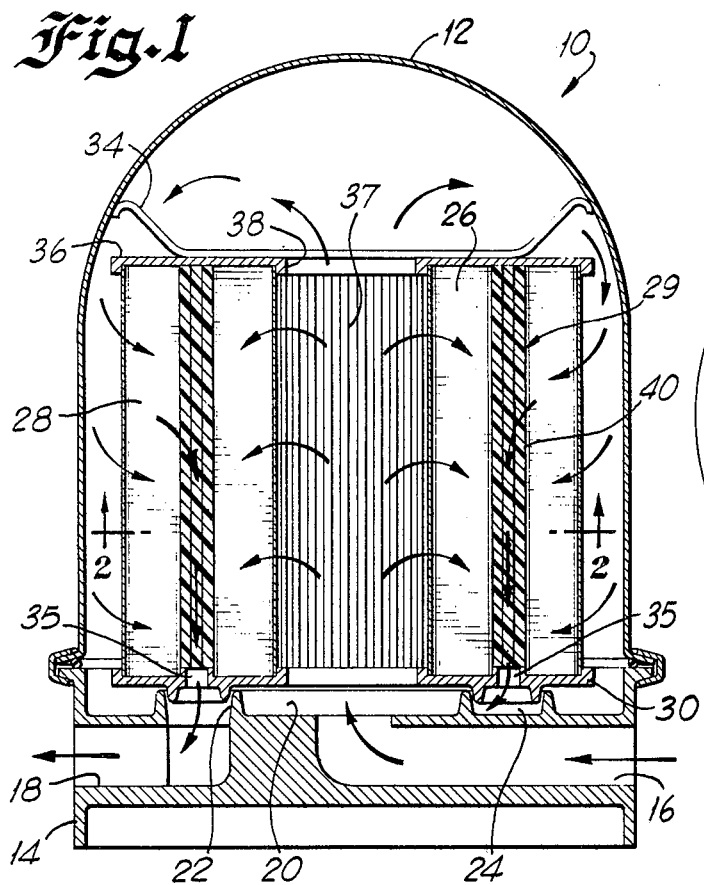
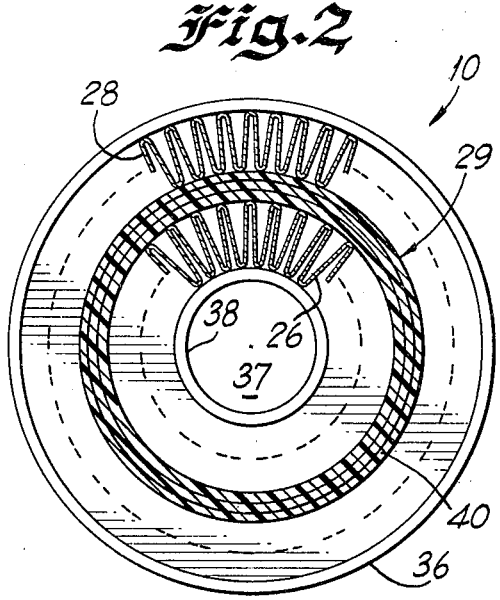
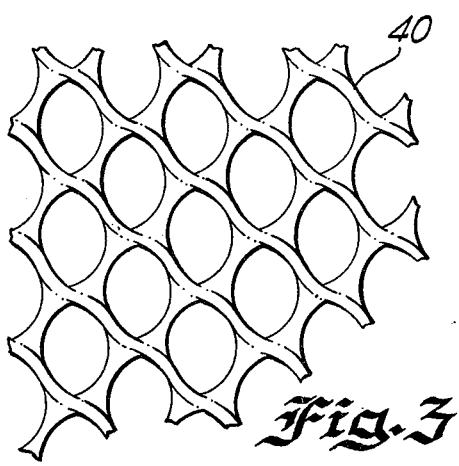
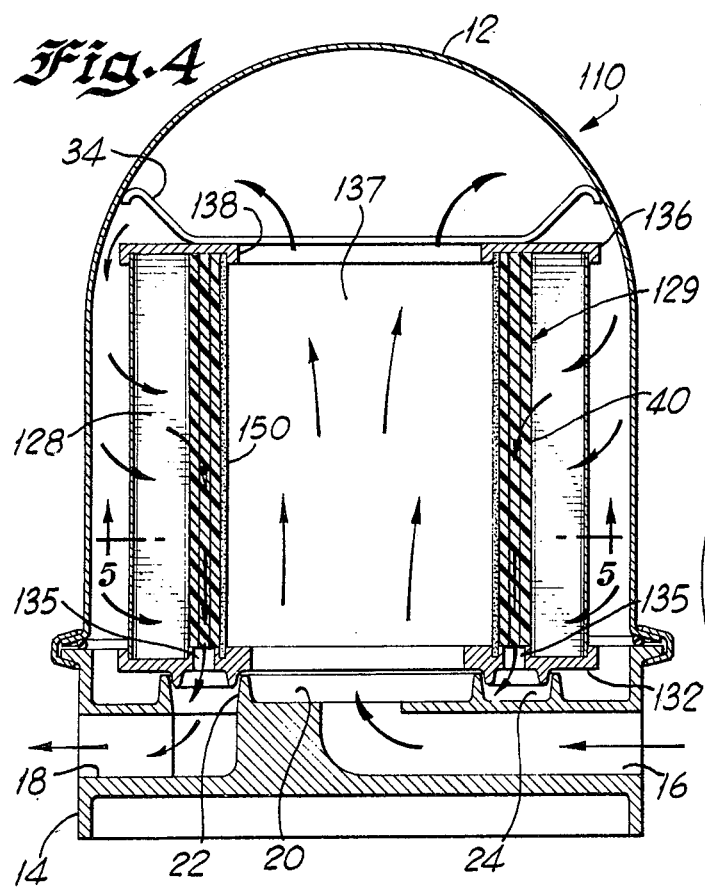
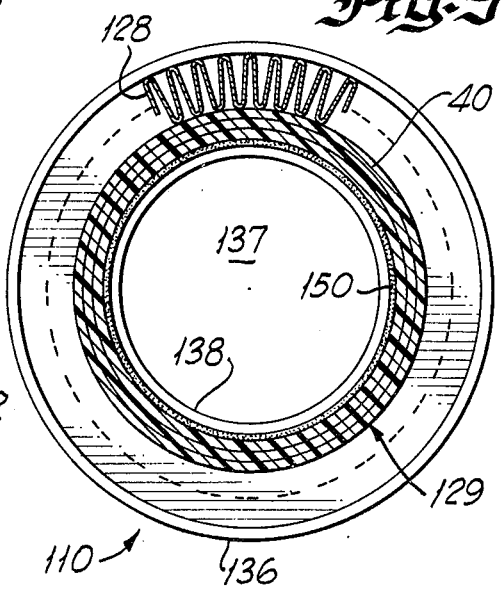

CARTRIDGE FILTER

BACKGROUND OF THE INVENTION

A. Field of the Invention

The present invention relates to a new and improved cartridge filter.

B. Description of the Prior Art

In many fluid systems, the working fluid is recycled through a filter so that foreign matter present in the fluid will not accumulate and clog or damage motors or other operating mechanisms. In order to purify the fluid, filter elements or strainers may be connected to a fluid line communicating with the fluid system. The utilization of two filter elements in a concentric arrangement is highly satisfactory for systems having large filtering demands.

An example of a typical prior art filter element using concentric filter elements is disclosed in U.S. Pat. No. 3,211,292. The device disclosed in that patent includes two concentric filter or strainer elements enclosed within a housing. This device employs rigid elements supporting each filter to prevent collapse due to the forces resulting from the pressure drop across the filter elements. The rigid support elements maintain the filter elements in a proper configuration while delimiting a passage for flow of filtered fluid to the outlet of the strainer. Since each support element must have strength and rigidity to resist the total force to which one filter element is subjected, this prior art strainer suffers from disadvantages including undesirable complexity in assembly and manufacturing, and high cost.

Another prior art device employed to overcome the problem of collapsing of filter elements due to the application of inlet pressure on opposing surfaces of concentric filter elements is illustrated in U.S. Pat. No. 3,420,377. In the device disclosed in that patent, concentric filter elements are positioned such that adjacent surfaces of the filter elements are abutting, thereby supporting each element against deformation due to the influence of the equal and opposite forces resulting from the pressure drop across the elements. Filters of this type suffer from clogging and reduced flow since there is no defined channel between the two filter elements through which filtered fluid may flow to the filter outlet. The fluid must flow between the folds of the inner filter element and these folds necessarily define narrow passages allowing buildup of foreign matter. In addition, the reduced cross-sectional area of the folds limits the fluid flow rate and reduces the capacity of the device.

A problem similar to those discussed above exists if only one filter element is used. With one filter element fluid at inlet pressure acts against one surface of the filter element and can crush the filter element unless a rigid support member is provided.

SUMMARY OF THE INVENTION

An object of the present invention is to provide a new and improved device for filtering fluid in a fluid system.

Also, an object of the present invention is to provide a new and improved method for preventing elements in a pressurized fluid environment from collapsing while allowing the filtered fluid to pass freely between the elements.

More specifically, it is another object of the present invention to provide a new and improved filtering device that includes a housing having a fluid inlet and outlet and concentrically mounted elements including a fluid carrier for transporting filtered fluid from a region located between the elements.

Briefly, the present invention is directed to a new and improved device commonly referred to as a cartridge filter for filtering fluid in a fluid system. The cartridge filter includes a housing having a fluid inlet and outlet and two fluid elements, at least one being a filter. Between the two elements is positioned a fluid carrier to maintain distance between the two elements and to allow flow of filtered fluid in a longitudinal direction to the outlet of the cartridge filter. In addition, the fluid carrier functions to transmit the equal and opposite fluid forces experienced by the fluid elements as a result of the pressure drop across the elements thereby allowing the forces to cancel each other. In this manner, the fluid elements maintain their optimum configuration extending the useful life of the cartridge filter while maintaining a distance between each other to allow free passage of filtered fluid.

BRIEF DESCRIPTION OF THE DRAWINGS

The above and other objects and advantages and novel features of the present invention will become apparent from the following detailed description of preferred embodiments of the invention illustrated in the accompanying drawings wherein:

FIG. 1 is a cross-sectional view of a preferred embodiment of a cartridge filter constructed in accordance with the principles of the present invention;

FIG. 2 is a cross-sectional view of the filter assembly of the cartridge filter taken along line 2—2 of FIG. 1;

FIG. 3 is a partial, greatly enlarged view of a portion of the fluid carrier of the filter assembly;

FIG. 4 is a cross-sectional view of a cartridge filter comprising an alternative embodiment of the invention; and FIG. 5 is a cross-sectional view of the filter assembly of the cartridge filter of FIG. 4 taken along line 5—5 of FIG. 4.

DESCRIPTION OF THE PREFERRED EMBODIMENT

With reference to FIGS. 1–3 of the drawing, therein is illustrated a cartridge filter 10 that may be incorporated into a fluid system for filtering the working fluid or the like. In the specific embodiment illustrated, the cartridge filter 10 comprises two exterior members, a one piece impervious housing 12 and a base 14. The cartridge filter 10 is connected to the fluid system (not shown) by means of the inlet port 16 and the outlet port 18. The inlet port 16 is in fluid communication with the interior of the housing 12 through an enlarged opening 20. The outlet 18 is also in fluid communication with the interior of the housing 12 through an opening 22 that communicates with an annular channel 24 fabricated in the upper surface of the base 14.

In accordance with an important feature of the present invention, mounted within the housing 12 and upon and above the base 14 are two concentric or telescoped annular filter elements 26 and 28 concentric with opening 20 and separated from each other by a space or separation 29. In this manner, working fluid from the fluid system entering inlet port 16 passes through opening 20 and is introduced along the longitudinal axis of the concentric filters 26 and 28 to be filtered thereby.

Filters 26 and 28 are supported at their lower ends by a retaining plate 30. The annular retaining plate 30 is provided with openings 35 in fluid communication with annular channel 24. Accordingly, fluid may pass between the annular filters 26 and 28 through the openings 35 and into the annular groove 24. This fluid is conducted along the annular groove or channel 24 to opening 22 and subsequently flows through the outlet 18 of the cartridge filter 10.

To maintain the filter elements 26 and 28 in a stable position within the housing 12 of the cartridge filter 10 there is included a strap 34 and an upper retaining plate 36. The strap 34 and the upper retaining plate 36 act in combination on the upper end of concentric filter elements 26 and 28 to hold them firmly in position against the lower retaining plate 30. The upper retaining plate 36 has a central aperture 38 that opens into the central cavity 37 defined by the inner periphery of filter 26. This aperture 38 permits fluid to flow from the central cavity 37 to the area above the concentric filter elements 26 and 28.

In addition, the upper retaining plate 36 closes the upper end of the separation 29 between the concentric filter elements 26 and 28. Accordingly, fluid may not enter this space 29 from above the concentric filter elements 26 and 28.

The cartridge filter 10 as described operates in a manner wherein fluid at an elevated pressure enters the cartridge filter 10 through inlet 16. This fluid is communicated to the central cavity 37 within concentric filter element 26 through opening 20. As indicated by the arrows in FIG. 1, a portion of this fluid interacts with the inner periphery of the filter element 26 passing therethrough and thereby being filtered. In addition, a portion of the fluid passes through aperture 38 and around the housing 12 to the outer periphery of concentric filter element 28. This portion of the fluid interacts with the outer peripheral surface of filter element 28 passing therethrough and being filtered thereby.

Accordingly, since the fluid passing through the filter elements 26 and 28 experiences a pressure drop resulting in a lower fluid pressure present in the space 29 between the concentric filter elements 26 and 28, there is a pressure differential created across each concentric filter element 26 and 28. The higher pressure interacting with the inner periphery of filter element 26 and the outer periphery of filter element 28 relative to the fluid pressure present in annular space 29 creates a buckling or compressing force acting on the concentric filter elements 26 and 28 tending to cause the filter elements 26 and 28 to collapse inwardly into the annular space 29.

In accordance with an important feature of the present invention, there is positioned in annular space 29 a carrier element 40. In the specific embodiment illustrated (FIG. 3), the carrier element 40 may be a molded plastic mesh or netting wound about itself several times. By having a mesh configuration, the carrier element 40 permits transverse and longitudinal flow of fluid. Accordingly, the carrier element 40 presents little resistance to fluid flow.

In accordance with an important feature of the invention, the carrier element 40 transmits or equalizes the fluid pressure forces acting on the outer periphery of filter element 28 and on the inner periphery of filter 26. In this manner, the permeable carrier element 40 transmits the substantially equal and opposite fluid pressure forces thus cancelling these forces and preventing collapse of the concentric filter elements 26 and 28. Since carrier 40, in order to prevent collapse of the filter elements 26 and 28, transmits as opposed to resists the pressure forces; it may be fabricated from a material of low cost and limited strength, such as plastic, thus eliminating the need for rigid members strong enough independently to support the filter elements 26 and 28. As compared with the rigid support elements presently used, carrier 40 need only have sufficient strength or resistance to crushing that it does not collapse to the extent that longitudinal fluid flow is terminated or unduly restricted.

In operation, the cartridge filter 10 is connected to a fluid system wherein working fluid containing debris is introduced into inlet 16 of cartridge filter 10. The working fluid passes through aperture 20 and into the annular cavity 37 within filter element 26. A portion of this fluid passes into and is filtered by filter element 26 eventually flowing into the annular space 29 defined between the filter elements 26 and 28. The remaining portion of the working fluid passes upwardly through aperture 38 and around to the space between the inner surface of housing 12 and the outer periphery of filter element 28 whereupon the fluid passes through and is filtered by filter element 28. The filtered fluid then flows into space 29.

The filtered fluid within annular space 29 flows longitudinally downward along carrier 40, through apertures 35 and into channel 24, whereupon the filtered fluid is transported along channel 24 to opening 22 and through outlet 18 to be returned to the working system.

Illustrated in FIGS. 4-5, is an alternate embodiment of the present invention. In these figures, elements bearing reference numerals defined previously herein are substantially similar in structure and function.

Illustrated in FIGS. 4-5 is a cartridge filter 110 having a housing 12 and a base 14. Base 14 includes an inlet port 16 and an outlet port 18, and further includes openings 20 and 22 communicating with the inlet 16 and outlet 18, respectively. Cartridge filter 110 further includes a strap 34 and an upper retaining plate 136 having a central aperture 138.

In accordance with an important feature of the present embodiment, there is positioned within the housing 12 a single annular filter element 128. The filter element 128 is held in position within the housing 12 of the cartridge filter 110 by the strap 34 and upper retaining plate 136. To maintain the filter element 128 in an upright position there is also included a lower retaining plate 132 mounted upon the channel 24. Plate 132 is similar in function and configuration as plate 30 in cartridge filter 10. The retaining plate 132 includes apertures 135 that communicate with the channel 24.

Also mounted within the lower and upper retaining plates 132 and 136 is an impervious backing member 150 that may be fabricated from plastic or the like. The backing member 150 is positioned within the retaining members 136 and 132 and concentric or telescoped with and spaced from the filter element 128 thus defining an annular cavity 129.

In this manner, working fluid entering the cartridge filter 110 through inlet 16 flows through opening 20 into the annular space 137 defined by the inner periphery of the backing member 150 and interacting with member 150 and directed thereby flows, as illustrated by the arrows in FIG. 4, upwardly through aperture 138 and around the inside of housing 12 to the outer periphery of filter element 128. The working fluid interacts with the outer periphery of the filter element 128 and passes therethrough and is filtered thereby. After passing through filter element 128, the filtered fluid enters the space 129 defined between the outer periphery of the backing member 150 and the inner periphery of the filter element 128.

In this configuration and in the filter 110 as described, the working fluid interacting on the outer periphery of the filter element 128 is at a given pressure whereas the pressure in space 129, due to the pressure drop across the filter element 128, is at a lesser pressure. Thus, the pressure differential created across the filter element 128 tends to crush the filter element 128 inwardly towards the backing member 150. Moreover, the backing or support member 150 is also subjected on its inner periphery to pressure forces from the working fluid tending to crush the member 150 toward the filter element 128. To counteract this crushing tendency, there is mounted in space 129 a carrier element 40 (FIG. 3). This carrier element 40 is wound around the backing member 150 (FIG. 4) and upon itself several times. Due to its mesh or netting configuration, fluid may flow transversely and longitudinally through and along the carrier element 40.

In this configuration the carrier element 40 transmits or equalizes the fluid pressures acting against the outer periphery of the filter element 128 with the pressure forces acting against the inner periphery of the backing member 150. Accordingly, the forces acting against the element 150 and the filter element 128 substantially cancel each other resulting in an environment wherein the filter element 128 and the backing member 150 need not be fabricated from stiff or rigid material in order to prevent collapse due to forces generated by fluid pressure.

In operation of the cartridge filter 110, working fluid carrying debris and the like, enters the cartridge filter 110 through inlet 16. The fluid passes into the interior of housing 12 as illustrated by the arrows in FIG. 4 and interacts against the inner periphery of backing member 150. The entire amount of working fluid flows through opening 138 and around to the outer peripheral surface of filter element 128 whereupon the unfiltered working fluid passes through and is filtered by the filter element 128. The filtered fluid then passes into the annular space 129. The filtered fluid is transported longitudinally downwardly along and through carrier element 40 to apertures 135 and enters channel 24. The fluid is then transported by channel 24 to opening 22 and out outlet 18 to be returned to the fluid system.

Obviously, many modifications and variations of the present invention are possible in light of the above teachings. Thus, it is to be understood that, within the scope of the appended claims, the invention may be practiced otherwise than as specifically described above.

What is claimed as new and desired to be secured by Letters Patent of the United States is:

1. A fluid filter assembly comprising in combination:

a housing having an inlet and an outlet and defining a cavity communicating with said inlet;

a filter cartridge supported in said cavity;

said cartridge including inner and outer, concentric, generally cylindrical, flexible elements;

the inner surface of said inner element and the outer surface of said outer element being exposed to inlet fluid pressure within said cavity;

at least one of said inner and outer elements comprising a pleated filter;

said inner and outer elements being separated to define therebetween a generally cylindrical region communicating with said outlet;

and the improvement characterized by a generally cylindrical carrier body in said region sandwiched between the inner surface of said outer element and the outer surface of said inner element;

said carrier body including passages permitting fluid flow in said region and being formed of flexible material providing resistance to crushing in the radial direction for transmitting radial fluid pressure forces between said inner and outer elements in order to maintain the separation between said elements.

2. The assembly of claim 1, both said inner and outer elements comprising pleated filters.

3. The assembly of claim 1, one of said inner and outer elements comprising a pleated filter and the other of said inner and outer elements comprising fluid impervious plastic material.

4. The assembly of claim 1, said carrier body having a mesh configuration with numerous interstices constituting said passages for permitting fluid flow.

5. The assembly of claim 4, said carrier body comprising a plurality of layers of plastic mesh.

* * * * *